United States Patent
Someya et al.

(10) Patent No.: US 6,967,013 B2
(45) Date of Patent: Nov. 22, 2005

(54) PROCESS FOR PRODUCING ALIGNED CARBON NANOTUBE FILMS

(75) Inventors: Masao Someya, Tsukuba (JP); Takashi Fujii, Tsukuba (JP); Masukazu Hirata, Tsukuba (JP); Shigeo Horiuchi, Tsukuba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/061,218

(22) Filed: Feb. 4, 2002

(65) Prior Publication Data

US 2003/0147801 A1 Aug. 7, 2003

(30) Foreign Application Priority Data

Mar. 14, 2001 (JP) .......................................... 2001-120357
Oct. 31, 2001 (JP) .......................................... 2001-372026

(51) Int. Cl.$^7$ ................................................. D01F 9/12
(52) U.S. Cl. ................................. 423/447.3; 423/447.1
(58) Field of Search ............................ 423/447.1, 447.3, 423/447.2, 445 B; 313/309, 310

(56) References Cited

U.S. PATENT DOCUMENTS

| | | | | |
|---|---|---|---|---|
| 4,244,938 A | * | 1/1981 | Alkaitis ..................... | 423/594.9 |
| 4,663,230 A | | 5/1987 | Tennent ....................... | 428/367 |
| 5,747,161 A | | 5/1998 | Iijima .......................... | 428/367 |
| 6,129,901 A | | 10/2000 | Moskovits et al. ........ | 423/447.3 |
| 6,232,706 B1 | | 5/2001 | Dai et al. .................... | 313/309 |
| 6,277,318 B1 | | 8/2001 | Bower et al. ................ | 264/346 |
| 6,278,231 B1 | * | 8/2001 | Iwasaki et al. .............. | 313/310 |
| 6,350,488 B1 | * | 2/2002 | Lee et al. ................... | 427/249.1 |
| 6,401,526 B1 | * | 6/2002 | Dai et al. ..................... | 73/105 |
| 6,514,113 B1 | * | 2/2003 | Lee et al. ..................... | 445/50 |
| 6,545,396 B1 | * | 4/2003 | Ohki et al. ................... | 313/309 |
| 2002/0112814 A1 | * | 8/2002 | Hafner et al. ............. | 156/272.2 |
| 2003/0203139 A1 | * | 10/2003 | Ren et al. ................... | 428/34.3 |

OTHER PUBLICATIONS

Kind et al. "Printing Gel–like Catalysts for the Directed Growth of Multiwalled Carbon Nanotubes", Jul. 22, 2000, Langmuir, vol. 16 pp. 6877–6883.*
Terrones et al. "Controlled production of aligned–nanotube bundles", Jul. 3, 1997, Nature, vol. 388, pp. 52–55.*
Li et al. "Large–Scale Synthesis of Aligned Carbon Nanotubes", Dec. 6, 1996, Science, vol. 274, pp. 1701–1703.*
"Helical Microtubes of Graphitic Carbon", Iijima, Nature, vol. 354, Nov. 7, 1991, pp. 56–58.
"Growth of Well–Aligned Carbon Nanotubes on a Large Area of Co–Ni Co–deposited Silicon Oxide Substrate by Thermal Chemical Vapor Deposition", Lee et al., Chemical Physics Letters 323 (2000) 554–559.
"Very Long Carbon Nanotubes", Nature, vol. 394, Aug. 13, 1998, pp. 631–632.
"Highly Ordered Carbon Nanotube Arrays for Electronics Applications", Li et al., Applied Physics Letters, vol. 75, No. 3, Jul. 19, 1999, pp. 367–369.

* cited by examiner

*Primary Examiner*—Stanley S. Silverman
*Assistant Examiner*—Peter J Lish
(74) *Attorney, Agent, or Firm*—Roylance, Abrams, Berdo & Goodman, L.L.P.

(57) ABSTRACT

A process for producing aligned carbon nanotube films, wherein a carbon compound is decomposed using a substrate that is coated with an element having no catalytic ability by itself and which loads a metallic element having catalytic ability or a compound thereof, thereby forming a film of fine carbon nanotubes on the surface of the substrate which are aligned in a direction perpendicular to the substrate.

20 Claims, 3 Drawing Sheets

PROCESS FOR PRODUCING ALIGNED CARBON NANOTUBE FILMS

BACKGROUND OF THE INVENTION

This invention relates to a process for producing an aligned carbon nanotube film comprising a multiple of aligned carbon nanotubes. The process of this invention is suitable for producing aligned carbon nanotube films that can be used in many applications including electron emitters, cell electrodes, gas separating membranes, sensors and storage of energy.

The carbon nanotube, first discovered by Sumio Iijima in 1991 [Nature, 354, pp. 56–58 (1991)], is a very slender, hollow tubular carbon material which is generally 1–100 nm in diameter and 1–100 μm long.

It has been proposed with great expectation that the carbon nanotube be used in a wide range of applications including electron emitters, cell electrodes, gas separating membranes, sensors and storage of energy. When carbon nanotubes are to be used in these applications, they are preferably shaped to be aligned in one direction so that they can be assembled into an apparatus effectively and easily while enabling the characters of the individual tubes to be combined in a compact way. It has also been demonstrated that from the viewpoint of electron emitting characteristics and physical properties such as strength, nanotubes with smaller outside diameters are advantageous.

Common methods for producing carbon nanotubes include arc discharge using graphite as an electrode, causing graphite to sublime with a laser, and vapor-phase decomposition of a carbon compound using a suspended metal catalyst. However, many of the carbon nanotubes obtained by these methods have no orientation and it has been impossible to form carbon nanotube bundles or films.

Methods of forming aligned carbon nanotube films or bundles are generally divided into two types, one of arranging preliminarily formed carbon nanotubes on a substrate (see, for example, JP 2001-130904 A) and the other of producing carbon nanotubes on a substrate per se. The second method is more desirable since it makes easy to obtain unidirectional and uniform orientation. Methods of forming carbon nanotubes on a substrate per se include the following: (1) a membrane of a metal which has catalytic ability is generated on a substrate and etched, followed by thermal decomposition of a hydrocarbon on the substrate [WO 00/30141, Chemical Physics Letters, 323, pp. 554–559 (2000), JP 2000-109308 A, JP 2001-15077 A, JP 2001-20071 A and JP 2001-20072 A]; (2) an iron-containing mesoporous silica substrate is prepared by a sol-gel process and reduced with hydrogen, followed by pyrolysis of acetylene [Nature, 394, pp. 631–632 (1998)]; (3) a plasma or microwaves are applied to a substrate to generate carbon nanotubes (JP 2000-203819 A); (4) a thin, single crystal silicon carbide film is formed on a silicon substrate by epitaxial growth, etched away from the substrate and subjected to a high-temperature heat treatment in an oxygen-containing atmosphere (JP 2000-109308 A); and (5) an aluminum substrate is anodized to prepare a template and cobalt is electrochemically deposited into the bottom of the channels in the oxide film and after it is reduced with carbon monoxide, acetylene is thermally decomposed [Applied Physics Letters, 75(3), pp. 367–369 (1999)].

However, these methods have problems such as the cumbersome steps required to prepare substrates for forming aligned carbon nanotubes and the limited area over which aligned carbon nanotubes can be formed and, hence, it has been difficult to realize inexpensive production of large-area, aligned carbon nanotube films that are suitable for the above-listed applications. What is more, those methods can only generate an aligned film of thick carbon nanotubes greater than 20 nm in outside diameter.

There has also been disclosed a method comprising the steps of coating a substrate with catalyst particles, thermally decomposing a hydrocarbon on the substrate and shaving off the generated carbon nanotubes (JP 2001-80912 A) but this process is not capable of producing aligned carbon nanotube films.

SUMMARY OF THE INVENTION

The present invention has been accomplished under these circumstances and has an object providing a process in which a substrate for forming a film of carbon nanotubes having small outside diameter and aligned is prepared by a simple method and which can produce a large-area and uniformly aligned carbon nanotube film.

This object of the invention can be attained by a process for producing aligned carbon nanotube films, in which a carbon compound is decomposed using a substrate that is coated with an element having no catalytic ability by itself and which loads a metallic element having catalytic ability or a compound thereof, whereby a film of carbon nanotubes which are aligned and have small outside diameter is formed on the surface of said substrate in a direction perpendicular to said substrate.

DETAILED DESCRIPTION OF THE INVENTION

Figure 1:
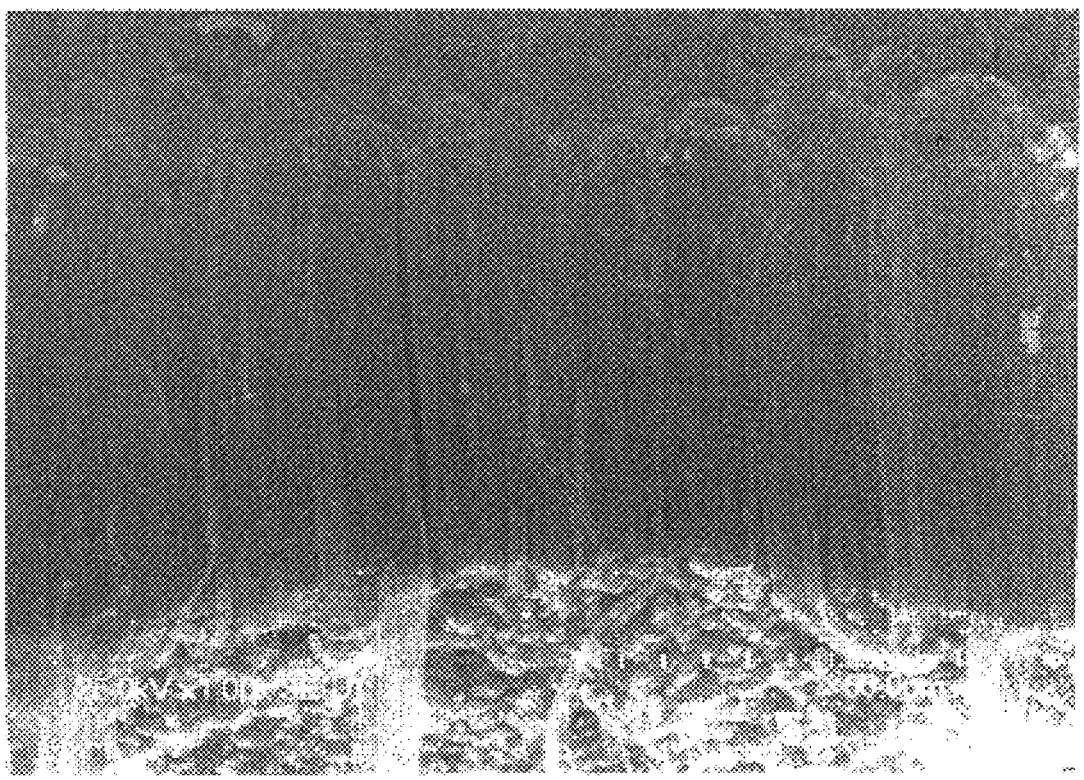
FIG. 1 is a scanning electron microscope (SEM) image of a section of a silica-alumina substrate having an aligned carbon nanotube film formed thereon.

The preferred embodiment of the invention is described below in detail. In this embodiment, the process for producing an aligned carbon nanotube film comprises the steps of coating a substrate with an element having no catalytic ability by itself, allowing a metallic element having catalytic ability or a compound thereof to be loaded on the substrate, and decomposing a carbon compound. It should be noted that the first and second steps may be performed simultaneously.

The substrate that can be used in the invention may be formed of silica, silica-alumina, alumina, aluminum, copper, silicon, silicon oxide, stainless steel, soda-lime glass, quartz glass, etc. Preferably, ceramic sheets of silica, silica-alumina, alumina, etc. are used, and more preferably, silica-alumina which is heat-, acid- and alkali-stable is used.

The ceramic sheets to be used in the invention are preferably porous. By being porous, the ceramic sheets can easily load the catalyst in a sufficiently large amount.

The porous ceramic sheets are preferably heated to dry in air before they are processed to prepare the substrate. As a result of heating, the absorbed moisture is eliminated and, in addition, any organic substance that is deposited in a very small amount is evaporated or burnt away, thus ensuring that coating with an element having no catalytic ability by itself can be performed consistently as a step in processing the porous ceramic sheet to prepare the substrate. The heating temperature is generally between 100 and 1000° C., preferably between 300 and 800° C. If the heating temperature is unduly low, the organic substance will not be decomposed through combustion; if the heating temperature is unduly high, the porous ceramic sheet will undergo undesirable calcination.

The element to be used in the first step which has no catalytic ability by itself is selected from the elements of groups IVa, Va, IIIb and IVb of the periodic table, which may be used either independently or in mixture of two or more of species. The preferred element is aluminum or germanium, with aluminum being particularly preferred. Using only these elements whether individually or in mixture, there will be no catalytic ability that causes a carbon compound to be decomposed to form carbon nanotubes.

In the first step of the process, coating with the element having no catalytic ability by itself may be performed by vacuum deposition, electrochemical deposition or sputtering. Vacuum deposition is preferred since it facilitates consistent generation of thin films. The amount of deposition is preferably between 5nm and 100 μm, more preferably between 0.05 and 5 μm, in terms of thickness.

The metallic element having catalytic ability which is to be used in the second step is selected from the metallic elements of groups VIa, VIIa and VIII of the periodic table which may be used either independently or in mixture of two or more species. The preferred metal species is cobalt, nickel, iron or a mixture of cobalt and nickel. In order to form fine catalyst particles, the metallic element having catalytic ability may appropriately be combined with other elements. In order that these particles serve as a catalyst for the production of carbon nanotubes, they generally have particle sizes between 0.1 and 50 nm, preferably between 1 and 20 nm.

To have these metallic elements or compounds thereof loaded on the substrate, general methods for allowing fine metal particles to be loaded on substrates may be used and impregnation, dipping or a sol-gel process is preferred as a technique that enables metallic species to be loaded on a large-area substrate in an easy and uniform way.

In the second step, it is sometimes preferred that the substrate on which the metallic element having catalytic ability or a compound thereof is loaded is calcined in air. The temperature of calcination in air is generally between 100 and 700° C., preferably between 300 and 500° C.

By performing either the coating operation (the first step) or the loading operation (the second step) or both in selected positions, one can control the position of forming an aligned carbon nanotube film. To effect such patterning, known techniques of lithography with light or electron beams, printing by transfer or spraying, as well as various machining techniques can be used.

As for the metallic element having catalytic ability and compounds thereof, cobalt compounds are used with particular advantage. Any compounds containing cobalt may be used as such cobalt compounds and they include, for example, cobalt salts such as cobalt nitrate, cobalt chloride, cobalt fluoride, cobalt bromide, cobalt iodide, cobalt sulfate, cobalt carbonate, cobalt acetate and cobalt naphthenate, cobalt complexes such as cobalt octacarbonyl and cobalt phthalocyanine, as well as cobalt hydroxide and cobalt oxide. These cobalt compounds may be used either in aqueous solution or suspension or on their own; they may be either independently or in mixture of two or more species.

A preferred method of allowing the cobalt compound to be loaded on a substrate is by first adding a base to an aqueous solution of a cobalt salt to prepare a suspension of cobalt hydroxide, then dipping an aluminum-coated ceramic substrate in the suspension.

Examples of the cobalt salt that can be used include the cobalt nitrate, cobalt chloride, cobalt fluoride, cobalt bromide, cobalt iodide, cobalt sulfate, cobalt carbonate, cobalt acetate or cobalt naphthenate. Among these, cobalt nitrate, cobalt acetate and cobalt naphthenate are preferred. Upon calcination in air, these cobalt salts are all converted to cobalt oxide and no other ions and compounds are left behind.

Any bases may be added to the aqueous solution of cobalt salt as long as they render the solution basic. Exemplary bases that can be used in the invention include sodium hydroxide, sodium carbonate, sodium hydrogencarbonate, sodium phosphate, potassium hydroxide, potassium carbonate, potassium hydrogencarbonate, ammonia, water-soluble amines, etc. These bases can be used either on their own or in aqueous solution. Among these, ammonia and water-soluble amines are used with advantage. These can be readily removed by a simple procedure such as calcination in air in the subsequent step and no salts such as alkali metal salts are left behind. For ease of handling, aqueous ammonia is used with particular advantage.

By adding a base to the aqueous solution of cobalt salt, a suspension of the fine particles of cobalt hydroxide is obtained. The ceramic sheet is dipped in the suspension right after it has been prepared or after it is freed of large particles by filtration or decantation. In the latter case, a cleaner aligned film with a reduced amount of amorphous carbon can be produced since undesirable large particles can be removed.

In the second step, the substrate as coated in the first step with the element having no catalytic ability by itself is dipped in the suspension of cobalt hydroxide. Specifically, the aluminum-deposited ceramic sheet is dipped in the fully agitated suspension. The dip time may be long enough for the fine particles of cobalt hydroxide to get fully into the surface of the substrate and a period of at least 3 minutes is preferred.

The substrate thus impregnated with the cobalt compound is then calcined in air. As a result, part of, or the whole of the cobalt compound is dehydrated and oxidized to cobalt oxide. The calcining temperature is generally between 200 and 1000° C., preferably between 300 and 800° C. An optimum value of the calcining time varies with the calcining temperature and a period of at least 1 hour is preferred. The calcining step completes the substrate for use in the production of a carbon nanotube film.

The carbon compound to be used in the third step may be of any type that causes carbon nanotubes to be formed in the presence of a suitable catalyst and may be exemplified by saturated hydrocarbon compounds such as methane, ethane and propane, unsaturated hydrocarbon compounds such as ethylene, propylene and acetylene, and oxygen-containing hydrocarbon compounds such as methanol, ethanol and acetone, with methane, ethylene, propylene and acetylene being preferred. These carbon compounds may be introduced in gaseous form or in mixture with an inert gas such as argon or as a saturated vapor in an inert gas. It is also possible to produce hetero element containing nanotubes by mixing the carbon compound with a compound containing a hetero element such as boron or nitrogen that are to be incorporated into the nanotube. Pyrolysis is the most common reaction for decomposing the carbon compound and the reaction temperature is preferably between 400 and 1100° C., more preferably between 500 and 900° C., and the reaction pressure is preferably between 1 kPa and 1 MPa, more preferably between 0.01 and 0.12 MPa.

In the embodiment under consideration, after the making of carbon nanotubes, the catalyst particles are often found at the tip of each carbon nanotube, namely, they are confined at the surface of the aligned carbon nanotube film which is away from the substrate.

According to the process of the invention, an aligned carbon nanotube film having a height of 10–200 μm and an area of at least 50 cm$^2$ can be generated uniformly on the substrate. The individual carbon nanotubes have outside diameters between 7 and 12 nm and are each a multi-walled nanotube consisting of 5–10 layers.

The following examples are provided to further illustrate the present invention but are in no way to be taken as limiting.

EXAMPLE 1

A square silica-alumina substrate consisting of 25% silica and 75% alumina and measuring 2 mm thick and 75 mm on each side was deposited with aluminum by vacuum deposition. The deposited aluminum film was 0.5 μm thick. The substrate was then dipped for 2 hours in an aqueous solution of cobalt nitrate at a concentration of 0.2 mol/L. The substrate was recovered from the aqueous solution and calcined in air at 400° C. for 3 hours. After the calcining, the substrate was placed horizontally in a tubular quartz glass furnace (diameter is 35 mm) with the aluminum-deposited side facing up. The tubular furnace was heated up to 700° C. with argon being blown horizontally at a flow rate of 1000 cm$^3$/min under atmospheric pressure (0.1 MPa). Subsequently, with the temperature of 700° C. being kept, a mixture of propylene (300 cm$^3$/min) and argon (1000 cm$^3$/min) was blown into the tubular furnace. After flowing of the propylene/argon mixed gas for 20 minutes, the gas supply was switched to argon and as argon was flowing, heating of the tubular furnace was stopped and it was left to cool to room temperature.

Figure 2:
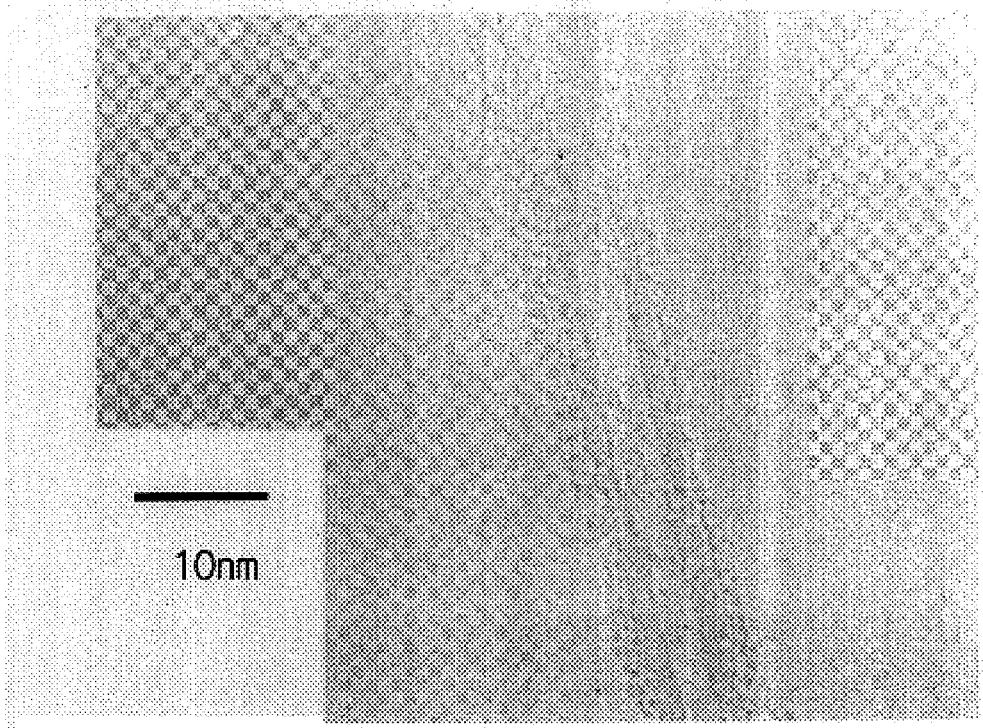
FIG. 2 is a transmission electron microscope (TEM) image of a carbon nanotube.
Figure 3:
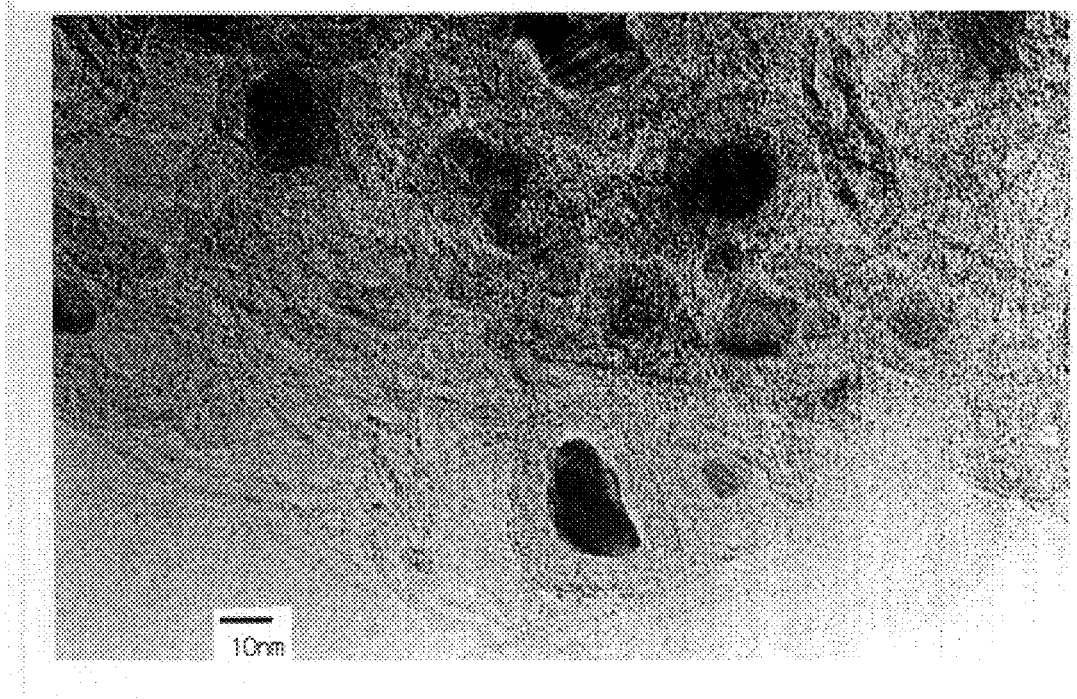
FIG. 3 is a TEM image of the tips of carbon nanotubes comprising an aligned film.

After the end of the reaction, the surface of the substrate was examined by SEM to confirm that an aligned carbon nanotube film was formed in a thickness of about 100 μm on the substrate. FIG. 1 is an SEM image of a section of the substrate as it was tilted by 30°. The aligned film was examined by TEM; the carbon nanotubes comprising the aligned film had outside diameters of 5–8 nm and were each a multi-walled nanotube consisting of about 5–7 layers, as shown in FIG. 2. The tips of carbon nanotubes comprising the aligned film were also examined by TEM and they were found to confine ultrafine (5–20 nm) metal particles, as shown in FIG. 3.

EXAMPLE 2

A square alumina substrate measuring 2 mm thick and 75 mm on each side was deposited with aluminum by vacuum deposition. The deposited aluminum film was 0.7 μm thick. In the next step, there was prepared a mixed solution containing cobalt nitrate and nickel nitrate each at a concentration of 0.1 mol/L; an aqueous solution of sodium hydrogencarbonate (0.4 mol/L) was added to the mixed solution and the mixture was stirred for 30 minutes. Thereafter, the mixture was decanted and the resulting sol was applied with a brush onto the aluminum deposited side of the substrate. The substrate was then dried at 100° C. for 30 minutes. The same procedure of coating and drying operations was repeated twice before the substrate was calcined in air at 400° C. for 3 hours. After the calcining, the substrate was placed horizontally in a tubular quartz glass furnace (diameter is 35 mm) with the aluminum deposited side facing up. The tubular furnace was heated up to 700° C. with argon being blown horizontally at a flow rate of 400 cm$^3$/min under atmospheric pressure (0.1 MPa). Subsequently, with the temperature of 700° C. being kept, a mixture of acetylene (50 cm$^3$/min) and argon (400 cm$^3$/min) was blown into the tubular furnace. After flowing of the acetylene/argon mixed gas for 20 minutes, the gas supply was switched to argon and as argon was flowing, heating of the tubular furnace was stopped and it was left to cool to room temperature.

After the end of the reaction, the surface of the substrate was examined by SEM to confirm that an aligned carbon nanotube film was formed in a thickness of about 80 μm on the substrate. An SEM image of a section of the substrate as it was tilted by 30° was substantially the same as the SEM image taken in Example 1; the TEM image of a carbon nanotube in the aligned film and the tips of carbon nanotubes comprising the aligned film were also substantially the same as the TEM images taken in Example 1.

EXAMPLE 3

A square silica-alumina substrate measuring 2 mm thick and 30 mm on each side was heated in air at 400° C. for 3 hours and then deposited with aluminum by vacuum deposition. The deposited aluminum film was 0.2 μm thick.

An aqueous solution of cobalt nitrate (0.3 mol/L) was cooled to 10° C. and to the stirred solution, 0.2 ml of 29% aqueous ammonia was added. Blue cobalt hydroxide particles were generated in the purple aqueous solution to form a suspension. After stirring the suspension for 10 minutes, the previously prepared aluminum-deposited substrate was dipped in the stirred suspension for 10 minutes.

The substrate was recovered from the suspension and calcined in air at 400° C. for 3 hours.

After the calcining, the substrate was placed horizontally in a tubular quartz glass furnace (diameter is 35 mm) with the aluminum-deposited side facing up. The tubular furnace was heated up to 700° C. with argon being blown horizontally at a flow rate of 360 cm$^3$/min under atmospheric pressure (0.1 MPa). Subsequently, with the temperature of 700° C. being kept, a mixture of propylene (120 cm$^3$/min) and argon (360 cm$^3$/min) was introduced into the tubular furnace. After flowing of the propylene/argon mixed gas for 20 minutes, the gas supply was switched to argon and as argon was flowing, heating of the tubular furnace was stopped and it was left to cool to room temperature.

After the end of the reaction, the surface of the substrate was examined by SEM to confirm that an aligned carbon nanotube film was formed in a thickness of about 100 μm on the substrate.

EXAMPLE 4

An aligned carbon nanotube film was produced as in Example 3, except that the supernatant of the suspension of cobalt hydroxide was separated out by decantation and used as a medium into which the aluminum-deposited substrate was dipped.

After the end of the reaction, the surface of the substrate was examined by SEM to confirm that an aligned carbon nanotube film was formed in a thickness of about 100 μm on the substrate.

EXAMPLE 5

Figure 4:
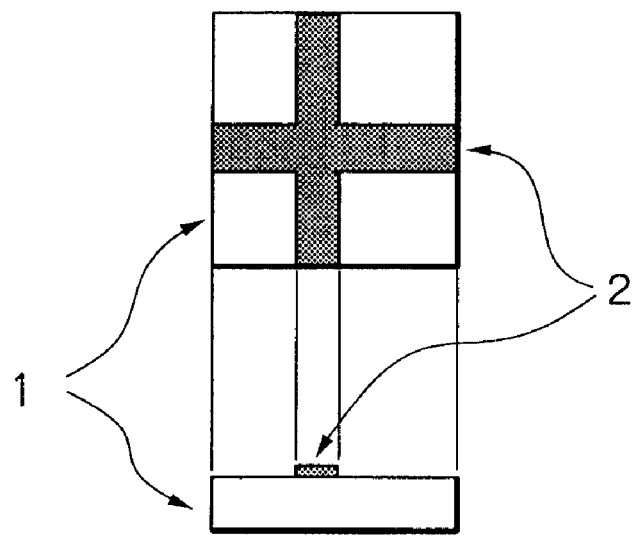
FIG. 4 is a schematic representation of a silica-alumina substrate partly masked with tape.

A silica-alumina sheet measuring 2 mm thick and 50 mm on each side was chosen as a substrate and after covering part of its surface with 10 mm thick masking tape as indicated by 2 in FIG. 4, aluminum was deposited on the substrate 1 by vacuum deposition. The deposited aluminum film was 0.5 μm thick. The substrate was then dipped for 2 hours in an aqueous solution of cobalt nitrate with a concentration of 0.2 mol/L. The substrate was recovered from the aqueous solution, stripped of the masking tape and calcined in air at 400° C. for 3 hours. After the calcining, the substrate was placed horizontally in a tubular quartz glass furnace (diameter is 35 mm) with the aluminum-deposited side facing up. The tubular furnace was heated up to 700° C. with argon being blown horizontally at a flow rate of 1000 $cm^3$/min under atmospheric pressure (0.1 MPa). Subsequently, with the temperature of 700° C. being kept, a mixture of propylene (300 $cm^3$/min) and argon (1000 $cm^3$/min) was blown into the tubular furnace. After flowing of the propylene/argon mixed gas for 20 minutes, the gas supply was switched to argon and as argon was flowing, heating of the tubular furnace was stopped and it was left to cool to room temperature.

Figure 5:
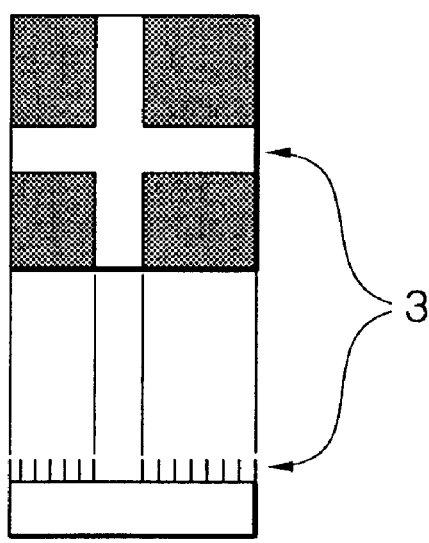
FIG. 5 is a schematic representation of an aligned carbon nanotube film formed in selective positions on the silica-alumina substrate.

The appearance of the substrate surface on the aluminum deposited side after the end of the reaction is shown in FIG. 5. Examination by SEM showed that an aligned carbon nanotube film 3 had been formed in a thickness of 60 μm on the surface of the substrate. The areas of the substrate where the masking tape had been applied took on slightly gray color and it was confirmed by SEM that no carbon nanotube had been formed in those areas.

Comparative Example 1

A square silica-alumina substrate consisting of 25% silica and 75% alumina and measuring 2 mm thick and 75 mm on each side was dipped for 2 hours in an aqueous solution of cobalt nitrate with a concentration of 0.2 mol/L. The substrate was recovered from the aqueous solution and calcined in air at 400° C. for 3 hours. After the calcining, the substrate was placed horizontally in a tubular quartz glass furnace (diameter is 35 mm). The tubular furnace was heated up to 700° C. with argon being blown horizontally at a flow rate of 1000 $cm^3$/min. Subsequently, with the temperature of 700° C. being kept, a mixture of propylene (300 $cm^3$/min) and argon (1000 $cm^3$/min) was blown into the tubular furnace. After flowing of the propylene/argon mixed gas for 20 minutes, the gas supply was switched to argon and as argon was flowing, heating of the tubular furnace was stopped and it was left to cool to room temperature.

After the end of the reaction, the surfaces of the substrate were examined by SEM; carbon nanotubes and particulate carbon with a particle size of about 100 nm were found to be generated on both top and bottom of the substrate but the carbon nanotubes were not aligned at all.

Comparative Example 2

A square alumina substrate measuring 2 mm thick and 75 mm on each side was deposited with aluminum by vacuum deposition. The deposited aluminum film was 0.8 μm thick. After the deposition, the substrate was calcined in air at 400° C. for 3 hours. After the calcining, the substrate was placed horizontally in a tubular quartz glass furnace with the aluminum deposited side facing up. The tubular furnace was heated up to 700° C. with argon being blown horizontally at a flow rate of 400 $cm^3$/min. Subsequently, with the temperature of 700° C. being kept, a mixture of acetylene (50 $cm^3$/min) and argon (400 $cm^3$/min) was blown into the tubular furnace. After flowing of the acetylene/argon mixed gas for 20 minutes, the gas supply was switched to argon and as argon was flowing, heating of the tubular furnace was stopped and it was left to cool to room temperature.

After the end of the reaction, the surfaces of the substrate were examined by SEM; particulate carbon having a particle size of about 100 nm had been generated on the top of the substrate but no carbon nanotubes had been formed.

According to the present invention, carbon nanotubes can be produced on a substrate by merely adopting a simple procedure of coating it with a non-catalytic element as by deposition and allowing a catalytic metallic element or a compound thereof to be loaded on it and, hence, the heretofore employed cumbersome procedure of substrate preparation can be obviated.

Further, in accordance with the present invention, aligned carbon nanotube films having larger areas than conventional ones can be produced on an industrial scale. Further, an aligned film can be formed of very fine carbon nanotubes with outside diameters of no more than 20 nm.

What is claimed is:

1. A process for producing aligned carbon nanotube films, which consists essentially of:
   (i) forming a substrate by depositing aluminum on a ceramic sheet to form an aluminum-deposited ceramic sheet, (ii) next loading an aqueous solution or suspension of a metallic catalytic compound on said aluminum-deposited ceramic sheet, and then (iii) calcining the resulting ceramic sheet to convert said metallic catalytic compound to a catalytic metal oxide, and (iv) decomposing a carbon compound on said substrate, thereby forming a film of carbon nanotubes on the surface of said substrate which are aligned in a direction perpendicular to said substrate, wherein said ceramic sheet is a porous silica-alumina sheet.

2. The process according to claim 1, wherein the metallic catalytic compound is at least one member of the group consisting of a metallic nitrate, a metallic chloride, a metallic fluoride, a metallic bromide, a metallic iodide, a metallic sulfate, a metallic carbonate, a metallic acetate, a metallic naphthenate, a metallic octacarbonyl, a metallic phthalocyanine, a metallic hydroxide and a metallic oxide.

3. The process according to claim 1, wherein the metallic catalytic compound is metallic hydroxide obtained by adding a base to an aqueous solution of a metallic salt, wherein said metallic hydroxide is in suspension.

4. The process according to claim 3, wherein the metallic catalytic salt is a metallic nitrate, a metallic chloride, a metallic fluoride, a metallic bromide, a metallic iodide, a metallic sulfate, a metallic carbonate, a metallic acetate or a metallic naphthenate.

5. The process according to claim 3, wherein the base is ammonia or a water-soluble amine.

6. The process according to claim 5, wherein aqueous ammonia is used as the base.

7. The process according to claim 1, wherein the a metallic catalytic compound which is loaded on the aluminum-deposited ceramic sheet comprises particles with a size of 1 nm to 100 nm.

8. The process according to claim 1, wherein the metallic catalytic compound is loaded by impregnation, dipping, a sol-gel process or a reverse micelle process.

9. The process according to claim 1, wherein the calcining temperature is between 300 and 800° C.

10. The process according to claim 1, wherein the ceramic sheet is heated to dry before aluminum is deposited.

11. The process according to claim 1, wherein aluminum is deposited by vacuum deposition, electrochemical deposition or sputtering.

12. The process according to claim 1, where the metallic catalytic compound is at least one member of the group consisting of a cobalt compound, a nickel compound, an iron compound, a platinum compound, a molybdenum compound and a ruthenium compound.

13. The process according to claim 1, wherein the metallic catalytic compound is at least one member of the group consisting of a cobalt compound, a nickel compound and an iron compound.

14. The process according to claim 1, wherein the metallic catalytic compound is a cobalt compound.

15. The process according to claim 1, wherein the carbon compound is at least one member of the group consisting of a saturated hydrocarbon compound, an unsaturated hydrocarbon compound, an aromatic hydrocarbon compound and an oxygen-containing compound.

16. The process according to claim 1, wherein the reaction temperature for the step of decomposing the carbon compound is between 400° and 1100° C.

17. A process for producing aligned carbon nanotube films, which process consists essentially of using a substrate that is obtained by loading a cobalt compound on an aluminum-deposited ceramic sheet, said cobalt compound being a suspension of cobalt hydroxide obtained by adding a base to an aqueous solution of a cobalt salt, and calcining the cobalt compound-loaded ceramic sheet, and decomposing a carbon compound thereby forming a film of carbon nanotubes on the surface of said substrate which are aligned in a direction perpendicular to said substrate, wherein said ceramic sheet is a porous silica-alumina sheet.

18. The process according to claim 17, wherein said cobalt salt is cobalt nitrate, cobalt chloride, cobalt fluoride, cobalt bromide, cobalt iodide, cobalt sulfate, cobalt carbonate, cobalt acetate or cobalt naphthenate.

19. The process according to claim 18, wherein the base is ammonia or a water-soluble amine.

20. The process according to claim 19, wherein aqueous ammonia is used as the base.

* * * * *